United States Patent
Nagano et al.

(10) Patent No.: US 11,880,478 B2
(45) Date of Patent: Jan. 23, 2024

(54) DISTRIBUTION MANAGEMENT APPARATUS, DISTRIBUTION MANAGEMENT SYSTEM, AND DISTRIBUTION MANAGEMENT METHOD

(71) Applicant: HITACHI, LTD., Tokyo (JP)

(72) Inventors: Hirofumi Nagano, Tokyo (JP); Masayuki Oyamatsu, Tokyo (JP); Shohei Yamagata, Tokyo (JP); Toshiomi Moriki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 530 days.

(21) Appl. No.: 17/263,666

(22) PCT Filed: Jul. 1, 2019

(86) PCT No.: PCT/JP2019/026173
§ 371 (c)(1),
(2) Date: Jan. 27, 2021

(87) PCT Pub. No.: WO2020/026676
PCT Pub. Date: Feb. 6, 2020

(65) Prior Publication Data
US 2021/0294914 A1 Sep. 23, 2021

(30) Foreign Application Priority Data
Jul. 30, 2018 (JP) .................. 2018-142396

(51) Int. Cl.
*H04L 29/06* (2006.01)
*G06F 21/62* (2013.01)
(Continued)

(52) U.S. Cl.
CPC .......... *G06F 21/6218* (2013.01); *G06F 9/466* (2013.01); *H04L 9/3236* (2013.01); *H04L 9/50* (2022.05)

(58) Field of Classification Search
CPC ... G06F 21/6218; G06F 9/466; H04L 9/3236; H04L 9/50
See application file for complete search history.

(56) References Cited

U.S. PATENT DOCUMENTS

| 2017/0155515 A1* | 6/2017 | Androulaki | ......... H04L 63/0823 |
| 2019/0147397 A1* | 5/2019 | Hodges | .................. G06Q 10/08 |
| | | | 705/333 |

FOREIGN PATENT DOCUMENTS

| JP | 2008-139995 A | 6/2008 |
| JP | 4111529 B2 | 7/2008 |

(Continued)

OTHER PUBLICATIONS

Examination Report for Indian Application No. 202117003880 dated Jan. 7, 2022.

(Continued)

*Primary Examiner* — Yogesh Paliwal
(74) *Attorney, Agent, or Firm* — MATTINGLY & MALUR, PC

(57) ABSTRACT

A traceability information management server includes: a transaction reception part that receives transaction data from a user client, the transaction data containing information on a completed process in distribution of a product and a concerned party in the completed process; an access right information generation part that generates access right information, the access right information being information on a relation between the completed process, the concerned party in the completed process, and a predetermined access right of the concerned party; an access right determination part that identifies, based on the access right information, information on a process in the distribution to which a sender of the received information provision request from the user client has an access right; and an information transmission (Continued)

part that transmits the identified information on the process to the user client that has sent the information provision request.

8 Claims, 16 Drawing Sheets

(51) Int. Cl.
  *G06F 9/46* (2006.01)
  *H04L 9/32* (2006.01)
  *H04L 9/00* (2022.01)

(56) References Cited

FOREIGN PATENT DOCUMENTS

| | | |
|---|---|---|
| JP | 2017-188883 A | 10/2017 |
| JP | 2018-055203 A | 4/2018 |
| JP | 2018-81464 A | 5/2018 |
| JP | 6341491 B1 | 6/2018 |
| WO | 2018056445 A1 | 3/2018 |

OTHER PUBLICATIONS

Singaporean Written Opinion received in corresponding Singaporean Application No. 11202100956X dated Jul. 29, 2022.
International Search Report of PCT/JP2019/026173 dated Sep. 24, 2019.

* cited by examiner

ACCESS RIGHT UPDATE RULE MASTER

| TRANSACTION TYPE | MAIN PARTY | | CONCERNED PARTY (TRANSFER DESTINATION) | | CONCERNED PARTY (AUDITOR) | |
|---|---|---|---|---|---|---|
| | ACCESS RIGHT (FORWARD) | ACCESS RIGHT (BACKWARD) | ACCESS RIGHT (FORWARD) | ACCESS RIGHT (BACKWARD) | ACCESS RIGHT (FORWARD) | ACCESS RIGHT (BACKWARD) |
| PROCESSING | GRANTED (TO DELIVERY) | GRANTED | – | – | NOT GRANTED | GRANTED |
| ASSEMBLY | GRANTED (TO DELIVERY) | GRANTED | – | – | NOT GRANTED | GRANTED |
| DELIVERY | NOT GRANTED | GRANTED | GRANTED | GRANTED | – | – |
| SALE | GRANTED | GRANTED | GRANTED (ONE STAGE) | GRANTED | – | – |
| SALE (BETWEEN CONSUMERS) | CANCELLED | CANCELLED | GRANTED (ONE STAGE) | GRANTED | – | – |
| USAGE | GRANTED (ONE STAGE) | GRANTED | – | – | – | – |
| STORAGE | GRANTED (ONE STAGE) | GRANTED | NOT GRANTED | GRANTED | NOT GRANTED | NOT GRANTED |

FIG. 5

TRANSACTION DATA
(MANUFACTURE TRANSACTION DATA)

400

| | | |
|---|---|---|
| 401 | TRANSACTION TYPE | MANUFACTURE |
| 402 | TIME AND DATE OF OCCURRENCE | 2018/3/24 10:00 |
| 403 | OPERATOR ID | 0011 |
| 404 | OPERATING MACHINE ID | M1023 |
| 405 | OPERATION KIND | ASSEMBLY |
| 406 | CONSTITUENT MEMBER | |
| |    MEMBER 1 | P1001 |
| 407 |    MEMBER 2 | P1002 |
| 408 | COMPLETED MEMBER ID | P2001 |
| 409 | OPERATOR'S ELECTRONIC SIGNATURE | 100ab190 |
| | AUDITOR'S ELECTRONIC SIGNATURE | 100abca1 |

FIG. 8

TRANSACTION DATA
(DELIVERY TRANSACTION DATA)

| | | |
|---|---|---|
| TRANSACTION TYPE | | DELIVERY |
| TIME AND DATE OF OCCURRENCE | | 2018/3/25 10:00 |
| ORDER PLACER ID | | 0101 |
| ORDER RECEIVER ID | | 0102 |
| TARGET MEMBER | | |
| | MEMBER 1 | P2001~P2010 |
| | QUANTITY | 10 |
| PRICE | | 10,000 |
| PAYMENT ID | | S1001 |
| ORDER PLACER'S ELECTRONIC SIGNATURE | | 100cd190 |
| ORDER RECEIVER'S ELECTRONIC SIGNATURE | | 100efga1 |

FIG. 9

600 → **TRANSACTION DATA
(SALE TRANSACTION DATA)**

| | |
|---|---|
| 601 — TRANSACTION TYPE | SALE |
| 602 — TIME AND DATE OF OCCURRENCE | 2018/3/28 10:00 |
| 603 — SELLER ID | 0201 |
| 604 — PURCHASER ID | 0302 |
| 605 — PRODUCT ID | P2001 |
| 606 — PRICE | 12,000 |
| 607 — SELLER'S ELECTRONIC SIGNATURE | 100ef190 |
| 608 — PURCHASER'S ELECTRONIC SIGNATURE | 100agea1 |

FIG. 10

700 → **TRANSACTION DATA
(USAGE TRANSACTION DATA)**

| TRANSACTION TYPE | USAGE |
|---|---|
| PERIOD | 2018/3/30 -2019/3/30 |
| OWNER ID | 0302 |
| PRODUCT ID | P2001 |
| OWNER'S ELECTRONIC SIGNATURE | 100agea1 |

701 — TRANSACTION TYPE
702 — PERIOD
703 — OWNER ID
704 — PRODUCT ID
705 — OWNER'S ELECTRONIC SIGNATURE

FIG. 11

800 → **TRANSACTION DATA
(STORAGE TRANSACTION DATA)**

| | |
|---|---|
| TRANSACTION TYPE | STORAGE |
| PERIOD | 2018/3/30 -2019/3/30 |
| OWNER ID | 0302 |
| STORER ID | 0403 |
| PRODUCT ID | P2001 |
| OWNER'S ELECTRONIC SIGNATURE | 100agea1 |
| STORER'S ELECTRONIC SIGNATURE | 100ekia1 |

801 — TRANSACTION TYPE
802 — PERIOD
803 — OWNER ID
804 — STORER ID
805 — PRODUCT ID
806 — OWNER'S ELECTRONIC SIGNATURE
807 — STORER'S ELECTRONIC SIGNATURE

FIG. 12

TRACEABILITY INFORMATION 900

| TRANSACTION ID 901 | INPUT 902 | OUTPUT 903 | TRANSACTION TYPE 904 | MAIN PARTY ID 905 | TRANSFER DESTINATION ID 906 | AUDITOR ID 907 |
|---|---|---|---|---|---|---|
| T10011 | – | P1001 | PROCESSING | 0011 | – | 1050 |
| T10012 | – | P1002 | PROCESSING | 0012 | – | 1050 |
| T10013 | – | P1003 | PROCESSING | 0013 | – | 1063 |
| T10014 | P1001 | P2001 | ASSEMBLY | 0014 | – | 1088 |
| T10014 | P1002 | P2001 | ASSEMBLY | 0014 | – | 1088 |
| T10014 | P1003 | P2001 | ASSEMBLY | 0014 | – | 1088 |
| T10015 | – | P2001 | DELIVERY | 0101 | 0102 | – |
| T10015 | – | P2002 | DELIVERY | 0101 | 0102 | – |
| T10016 | – | P2001 | SALE | 0102 | 0302 | – |
| T10017 | – | P2001 | USAGE | 0302 | – | 0903 |
| T10018 | – | P2001 | SALE | 0302 | 0411 | – |
| ... | ... | ... | ... | ... | ... | ... |

FIG. 14

ACCESS RIGHT INFORMATION 1000

| TRANSACTION ID (1001) | TRANSACTION TYPE (1002) | TARGET PARTY ID (1003) | ACCESS RIGHT STATUS (FORWARD) (1004) | ACCESS RIGHT STATUS (BACKWARD) (1005) |
|---|---|---|---|---|
| T10011 | PROCESSING | 0011 | RETAINED | RETAINED |
| T10011 | PROCESSING | 1050 | RETAINED | RETAINED |
| T10012 | PROCESSING | 0012 | RETAINED | RETAINED |
| T10012 | PROCESSING | 1050 | RETAINED | RETAINED |
| T10013 | PROCESSING | 0013 | RETAINED | RETAINED |
| T10013 | PROCESSING | 1063 | RETAINED | RETAINED |
| T10014 | ASSEMBL | 0014 | RETAINED | RETAINED |
| T10014 | ASSEMBL | 1088 | RETAINED | RETAINED |
| T10015 | DELIVERY | 0101 | RETAINED | RETAINED |
| T10015 | DELIVERY | 0102 | RETAINED | RETAINED |
| T10016 | SALE | 0102 | RETAINED | RETAINED |
| T10016 | SALE | 0302 | RETAINED | RETAINED |
| T10017 | USAGE | 0302 | RETAINED | RETAINED |
| T10017 | USAGE | 0903 | RETAINED | RETAINED |
| T10018 | SALE | 0302 | CANCELLED | CANCELLED |
| T10018 | SALE | 0411 | RETAINED | RETAINED |
| ... | ... | ... | ... | ... |

FIG. 15

DISTRIBUTION MANAGEMENT APPARATUS, DISTRIBUTION MANAGEMENT SYSTEM, AND DISTRIBUTION MANAGEMENT METHOD

TECHNICAL FIELD

The present invention relates to a distribution management apparatus, a distribution management system, and a distribution management method.

BACKGROUND ART

===Incorporation by Reference===

This application is based upon and claims the benefit of priority to Japanese Patent Application No. 2018-142396 filed on Jul. 30 2018, the entire contents of which are incorporated herein by reference.

There are increasing demands for traceability of information on a product such as origins of its components, distribution channels, its usage status in the overall supply chain from procurement and processing of components and product assembly in a manufacture process of a product, to shipment and sale of the product, to operation, usage, and maintenance of the product by a user, and then to later secondary usage, disposal, and recycling of the product. As a background to this, with a supply chain becoming more disperse and moving globally, costs are increasing for proving the validity of distribution, such as handling recalling by a maker, handling complaints from users, handling theft and forgery of a product, and handling audit trails.

As a technique for bringing efficiency to handling of these matters, Patent Literature 1, for example, discloses a method of adding an electronic signature to a group of items collectively so that records of complicated distribution channels regarding a product made up of many parts can be correctly recorded and efficiently verified.

Patent Literature 2 discloses a method that enables free access to traceability information dispersed among parties involved in a supply chain and manages access rights to the traceability information.

CITATION LIST

Patent Literature

[PTL 1] Japanese Patent No. 4111529
[PTL 2] Japanese Patent Application Publication No. 2008-139995

SUMMARY OF INVENTION

Technical Problem

These days, a user of a product not only uses or consumes the product sold to them, but also tends to resell the product, and accordingly, the reselling market such as flea markets and auctions is expanding. In such market, added value changes depending on the statuses of a product after sale, such as who owned the product, how the product was used, and how the product was stored. However, it is difficult to correctly prove such attribute information on a product.

The sharing market is also expanding, in which a purchased product is not only used by a single user, but also shared with other users. In such market, users frequently change, and it is accordingly difficult to keep track of or identify a particular user or product (for example, a user that used the product in a problematic way).

Recently, utilization of blockchain technology has been proposed as a method for allowing everyone to share a correct trail of attribution information on a product. It is conceivable to use this blockchain technology with the techniques in Patent Literatures 1 and 2. For example, it is conceivable that when reselling a product, the owner proves the current value of the product based on a trail of traceability information on the product (for example, information such as the owner, a party to which the product is resold, and the price) in a supply chain, sets a price, and sells the product to another user, and then, the purchasing party can make the purchase based on the trail of the traceability information.

However, this traceability information poses problems from perspectives such as personal information protection if parties other than the owner of the product has unlimited access to the traceability information. For example, Patent Literature 2 discloses a method of performing reference control according to access rights by including an access right check part that, when requested for reference to traceability information, checks a reference right by referring to a transactional relation master database. However, settings of the access rights are static, and this method does not necessarily achieve appropriate protection of personal information.

The present invention has been made in view of such a background, and has an object to provide a distribution management apparatus, a distribution management system, and a distribution management method capable of appropriately setting access rights to information on processes in the distribution of a product.

Solution to Problem

To overcome the challenges described above, one aspect of the present invention is a distribution management apparatus comprising: a transaction reception part that receives transaction data from a predetermined terminal, the transaction data containing information on a completed one of processes in distribution of a predetermined product and a concerned party in the completed process; an access right information generation part that generates access right information based on the received transaction data, the access right information being information on a relation between the completed process, the concerned party in the completed process, and a predetermined access right of the concerned party; an information provision request reception part that receives an information provision request for a process in the distribution of the product from a predetermined terminal; an access right determination part that identifies, based on the access right information, information on a process in the distribution to which a sender of the received information provision request has an access right; and an information transmission part that transmits the identified information on the process to the terminal that has sent the information provision request.

Advantageous Effects of Invention

The present invention can appropriately set access rights to information on processes in the distribution of a product.

BRIEF DESCRIPTION OF DRAWINGS

FIG. 5 is a diagram illustrating an example access right update rule master.

FIG. 8 is a diagram illustrating an example of manufacture transaction data.

FIG. 9 is a diagram illustrating an example of delivery transaction data.

FIG. 10 is a diagram illustrating an example of sale transaction data.

FIG. 11 is a diagram illustrating an example of usage transaction data.

FIG. 12 is a diagram illustrating an example of storage transaction data.

FIG. 14 is a diagram illustrating an example of traceability information.

FIG. 15 is a diagram illustrating an example of an access right information database.

DESCRIPTION OF EMBODIMENTS

An embodiment of the present invention is described below using the drawings.

<<System Configuration>>

Figure 1:
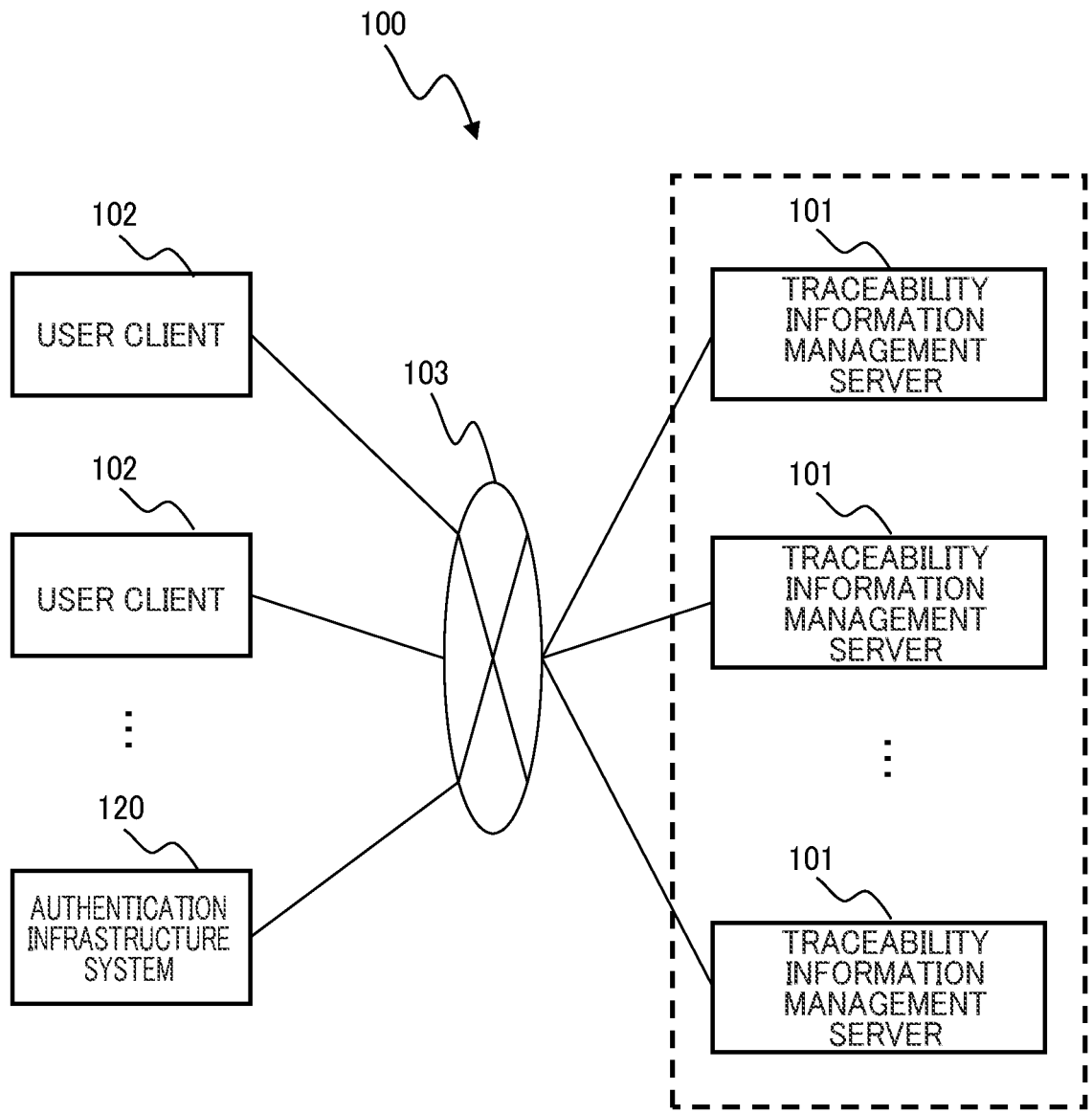
FIG. 1 is a diagram illustrating an example configuration of a traceability system of the present embodiment.

FIG. 1 is a diagram illustrating an example configuration of a traceability system 100 which is a distribution management system of the present embodiment. The traceability system 100 is an information processing system that manages distribution channels of a predetermined product in a supply chain system of the product (traceability). The traceability system 100 is configured including an authentication infrastructure system 200 and nodes which are a plurality of traceability information management servers 101 (distribution management apparatuses) and at least one user client 102.

The traceability information management servers 101 manage transactions in a supply chain and information on traceability of the transactions (hereinafter referred to as supply chain information).

A distributed ledger system using blockchain is constructed by the plurality of traceability information management servers 101, and blockchain data of transaction data indicating a process in distribution of a product is shared by the nodes (the traceability information management servers 101). Blockchain data is formed by a plurality of chronologically-linked blocks of data, each of which contains a plurality of transactions and a hash of the previous block of data. Each node generates transaction data with a predetermined electronic signature added thereto, conducts consensus building for the generated transaction data, and at predetermined timing (for example, at predetermined time intervals), generates a block of data by putting a plurality of pieces of transaction data together. The blockchain data generated as a result is shared by the nodes.

In the present embodiment, in a process in distribution of a product, a main party that executes the process and optionally one or more concerned parties are involved. Herein, a concerned party is, for example, a company employee involved in the manufacture, distribution, or sale of a product (such as, for example, an operator engaging in processing or assembly in a manufacture process, a person in a procurement department in charge of placing and receiving orders, a logistics operator in a distribution process, or a sales business operator), an employee in an auditing organization (an auditor), and a consumer that purchases or uses the product (including, for example, a purchaser of the product, a purchaser of the product resold, a user of a sharing service or the like, a repairer, a recycling business operator, and the like).

The user client 102 is a terminal used by a predetermined user (such as, for example, a main party that executes a process in a supply chain or a concerned party), and performs registration of supply chain information and reference to supply chain information by accessing the traceability information management server 101.

The authentication infrastructure system 200 verifies an electronic signature added to transaction data.

The traceability information management server 101, the user client 102, and the authentication infrastructure system 200 are communicatively coupled to one another via a wired or wireless communication network 103, such as, for example, a LAN (local area network), a WAN (wide area network), the Internet, or a dedicated line.

Figure 2:
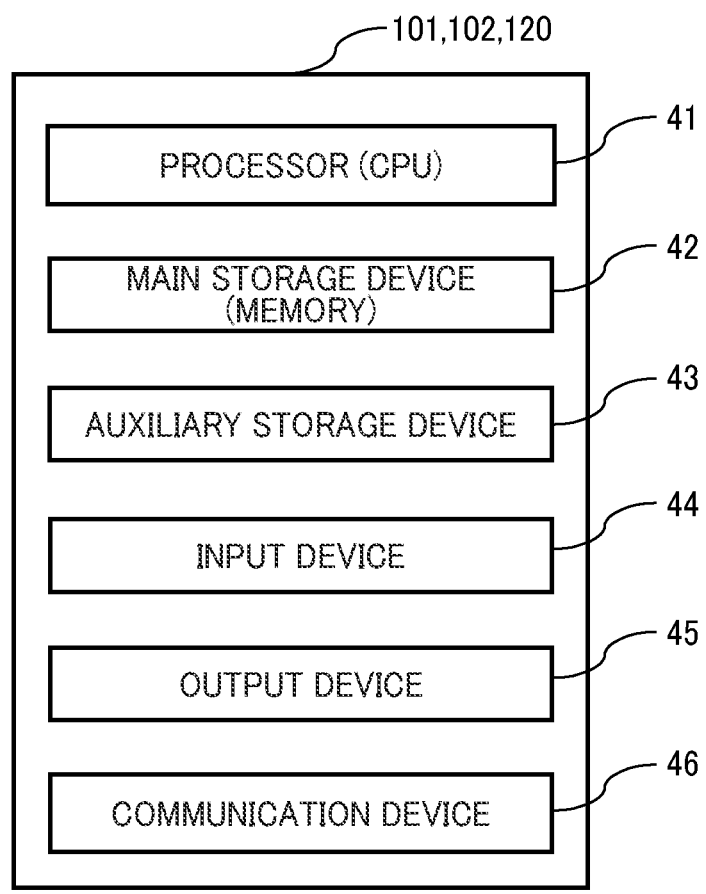
FIG. 2 is a diagram illustrating example hardware in each node.

FIG. 2 is a diagram illustrating an example of hardware in each node. Each node includes a processor 41 such as a CPU (central processing unit), a main storage device 42 such as a RAM (random-access memory) or a ROM (read-only memory), an auxiliary storage device 43 such as an HDD (hard disk drive) or an SSD (solid-state drive), an input device 44 including a keyboard, a mouse, a touch panel, and/or the like, an output device 45 including a monitor (display) or the like, and a communication device 46 that communicates with other nodes.

<<Distribution Channels in a Supply Chain>>

Figure 3:
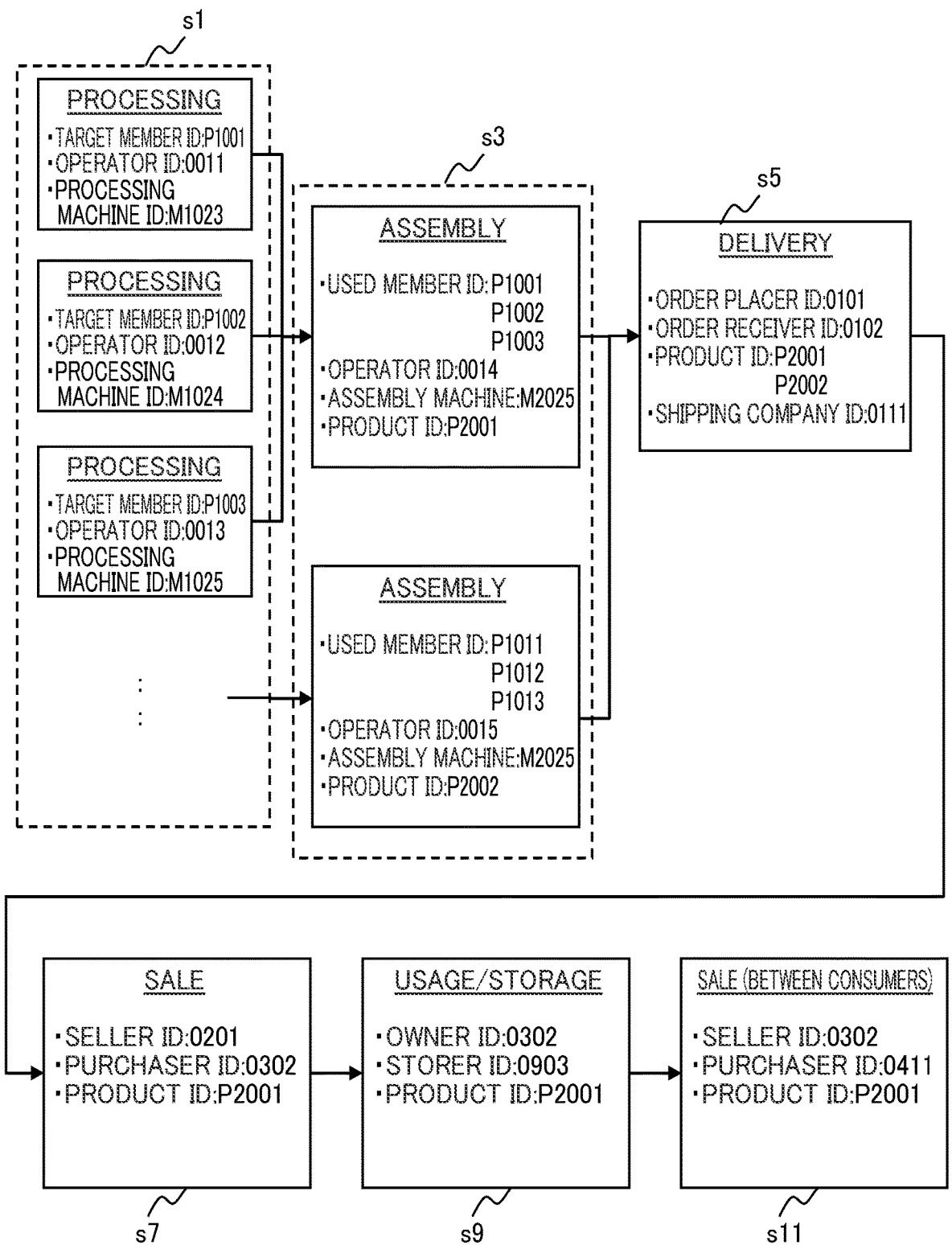
FIG. 3 is a diagram illustrating example distribution channels of a product in a supply chain in the present embodiment.

FIG. 3 is a diagram illustrating example distribution channels of a product in a supply chain in the present embodiment.

Distribution channels of the present embodiment include processing processes (s1) in each of which a predetermined manufacturer (a manufacturing company) performs predetermined processing to make a predetermined member and manufacture processes (s3) in each of which the members thus made are assembled to manufacture a predetermined product. The distribution channels also include a delivery process (s5) in which the product manufactured by the manufacturer is delivered to a predetermined delivery destination (for example, a shipping company or a distributor) and then a sale process (s7) in which the delivery destination assigns (for example, sells) the product to a consumer. The distribution channels also include a usage process in which the consumer uses the product and a storage process in which the consumer has a third party store the product (s9). The distribution channels further include a sale process (s11) in which the consumer to which the product has been assigned assigns (for example, sells) the product to another consumer.

From perspectives of such as personal information protection and security, it is not preferable to provide (or disclose) information on these processes to all the concerned parties in the supply chain. Thus, the traceability system 100 of the present embodiment sets an access title to information on each process in distribution channels according to the type of the process, so that the information on the process may be made available only to necessary concerned parties to a necessary extent.

<<Functions>>

Next, a description is given of functions of each node (information processing apparatus) in the traceability system 100.

<Traceability Information Management Server>

Figure 4:
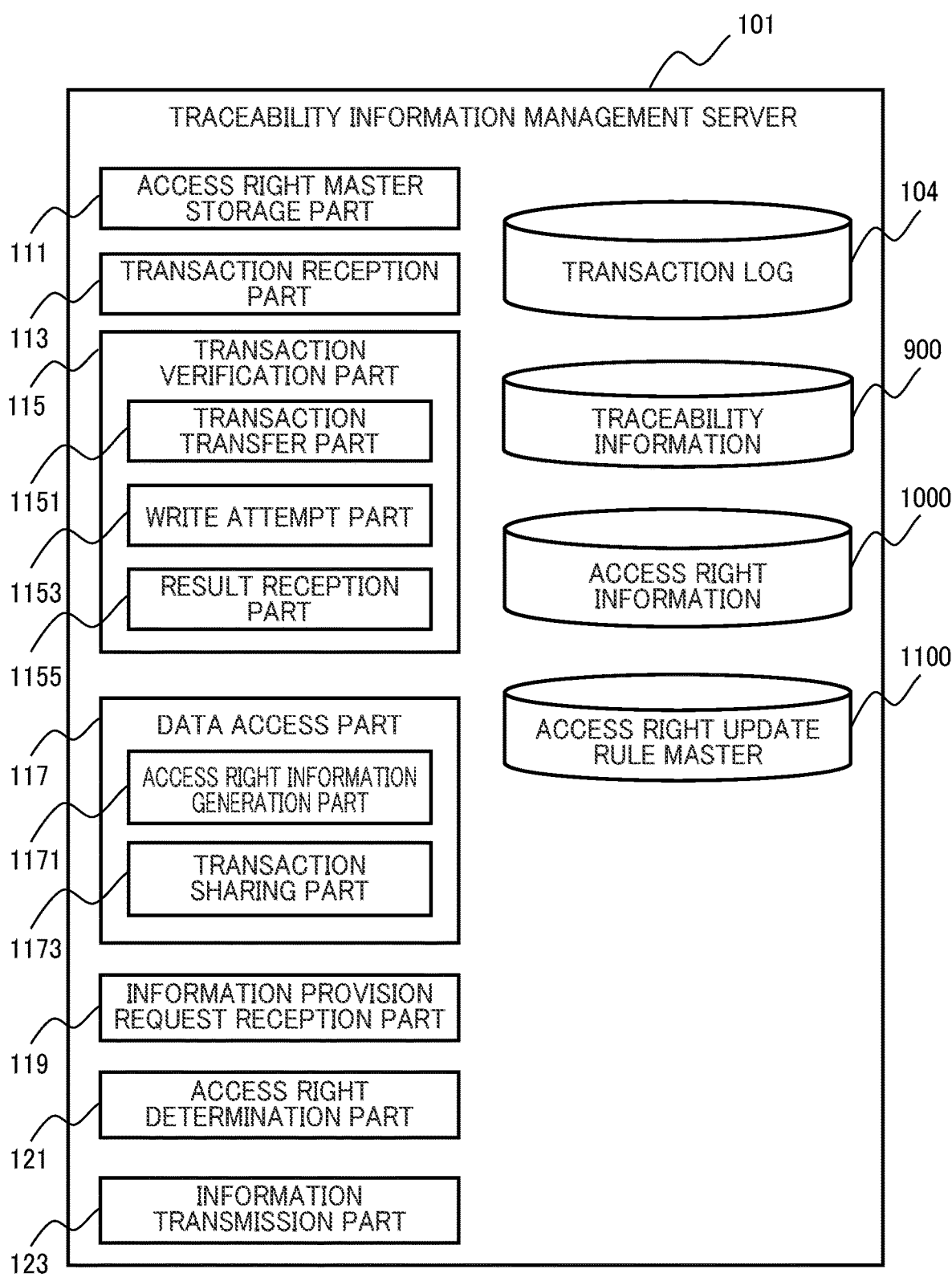
FIG. 4 is a diagram illustrating example functions of a traceability information management server.

FIG. 4 is a diagram illustrating example functions of the traceability information management server 101. The traceability information management server 101 stores a transaction log 104 in which a history of transaction data is recorded in the form of blockchain data, traceability information 900 in which information such as a completed transaction and concerned parties in the transaction is recorded, access right information 1000 in which access rights to transaction data are recorded, and an access right update rule master 1100 in which given relations between transactions, concerned parties, and access rights are recorded.

(Access Right Update Rule Master)

FIG. 5 is a diagram illustrating an example of the access right update rule master 1100. The access right update rule master 1100 has the following items: a transaction type 1101 for storing information indicating the type of a transaction (the type of a process), a main party 1103 for storing information on access rights of a main party in a process of the type indicated by the transaction type 1101 (a party that executes the process), a transfer destination 1105 for storing information on a party at the transfer destination of a product among concerned parties in a process of the type indicated by the transaction type 1101, and an auditor 1107 for storing information on an auditor among concerned parties in a process of the type indicated by the transaction type 1101.

An auditor is a party that needs to audit a transaction, including, for example, a certification body or an accounting corporation.

A party at the transfer destination may be, for example, a purchaser, an assignment destination, or a user when a process related to transaction data is order placing and receiving, sale, assignment, or usage.

Stored in each of the main party 1103, the transfer destination 1105, and the auditor 1107 is information on access rights, or more specifically, a forward access right 1108 for storing information on an access right to downstream processes in the distribution channels (a forward access right) and a backward access right 1109 which is information on an access right to upstream processes in the distribution channels (a backward access right). Information stored in the forward access right 1108 and the backward access right 1109 is, for example, information on whether the party is granted an access right or information on to which process in the distribution channels the party is granted a right.

For example, in the example in FIG. 5, for the transaction type "processing", a processor, who is the main party here, is responsible as a manufacturer. Hence, as to downstream processes, the processor is granted an access right limited down to "delivery" to the delivery destination, and as to the upstream processes, the processor has the right to know about the processes up to the current process and is therefore granted an unlimited access right. The auditor is also responsible as an auditor for processes up to the current process, and is therefore granted an access right to only the upstream processes. The main party has the right to access the process executed by the main party themselves. The above applies to cases where the transaction type is "assembly".

For the transaction type "delivery", the main party, which is a manufacturer here, should not be able to trace information on processes after delivery to a dealer, and is therefore not granted a forward access right ("NOT GRANTED"), but is granted an access right to all the processes down to the delivery because the manufacturer is responsible as a manufacturer. The dealer, which is the transfer destination here, is granted an access right to all the upstream and downstream processes to be able to fulfill accountability to the purchaser.

For the transaction type "sale", the seller, which is the main party here, is granted an access right to all the upstream and downstream processes to be able to fulfill accountability to a purchaser as described above.

For the transaction type "sale (between consumers)" (sale from one consumer to another), the access right of the seller (reseller), which is the main party here, is cancelled for both upstream and downstream processes, and the buyer (purchaser), which is the transfer destination, is granted a forward access right for one stage (one process) and an unlimited backward access right. The access rights can thus be set so that after reselling the product to the purchaser, the reseller cannot trace information such as to whom the purchaser of the product has further sold the product.

For the transaction type "usage", only the user, which is the main party here, is granted an access right so that only the user can refer to the process.

For the transaction type "storage", the transfer destination and the auditor are granted a backward access right. A storer, which is the main party here, is granted a forward access right for only one process.

Referring back to FIG. 4, the traceability information management server 101 includes an access right master storage part 111 that stores the access right information 1000, a transaction reception part 113, a transaction verification part 115, a data access part 117 that accesses databases, an information provision request reception part 119, an access right determination part 121, and an information transmission part 123.

The access right master storage part 111 stores an access right master (the access right update rule master 1100), which is information storing relations between the types of processes in distribution of a product and the access rights of concerned parties in the processes.

Concerned parties in each process in the access right master (the access right update rule master 1100) include at least one of a party that executes the process, a party at the transfer destination of a product resulting from the process, and an auditor of the process.

An access right includes a forward access right which is an access right such that a concerned party retaining the access right is allowed to access a process completed after the process completed by the concerned party, or a backward access right which is an access right such that a concerned party retaining the access right is allowed to access a process completed before the process completed by the concerned party.

The transaction reception part 113 receives transaction data from a predetermined terminal (the user client 102), the transaction data containing information on a completed one of processes in the distribution of a predetermined product and concerned parties in the completed process.

The transaction verification part 115 includes a transaction transfer part 1151, a write attempt part 1153, and a result reception part 1155.

The transaction transfer part 1151, upon receipt of transaction data, transfers the received transaction data to the other distribution management apparatuses (traceability information management servers 101).

The write attempt part 1153 generates predetermined data based on received transaction data, and generates information on a generation result of the predetermined data.

The result reception part 1155 receives, from the other distribution management apparatuses (traceability information management servers 101), generation results of the predetermined data generated by the other distribution management apparatuses (traceability information management servers 101) based on the transferred transaction data.

The data access part 117 includes an access right information generation part 1171 and a transaction sharing part 1173.

The access right information generation part 1171 generates the access right information 1000 based on the transaction data received by the transaction reception part 113, the access right information 1000 being information on the relation between a completed process, a concerned party in the completed process, and a predetermined access right of the concerned party.

As the access right information 1000, the access right information generation part 1171 generates, for example, information storing a relation between the type of a completed process, a concerned party in the completed process, and the access right of the concerned party, based on the access right master (the access right update rule master 1100).

The access right information generation part 1171 generates the access right information 1000 if a predetermined number of results from among the generation results received by the result reception part 1155 match.

If the predetermined number of results match, the transaction sharing part 1173 generates a block of data containing the received transaction data and a hash of the past transaction data, and shares blockchain data containing the generated block of data with the other distribution management apparatuses (the traceability information management servers 101).

The information provision request reception part 119 receives an information provision request for a process in distribution of a product from a predetermined terminal (the user client 102).

The access right determination part 121 identifies, based on the access right information 1000, information on a process in distribution to which the sender of the information provision request received by the information provision request reception part 119 has an access right.

The information transmission part 123 sends information on the process identified by the information provision request reception part 119 to the terminal (the user client 102) that has sent the information provision request.

<User Client>

Figure 6:
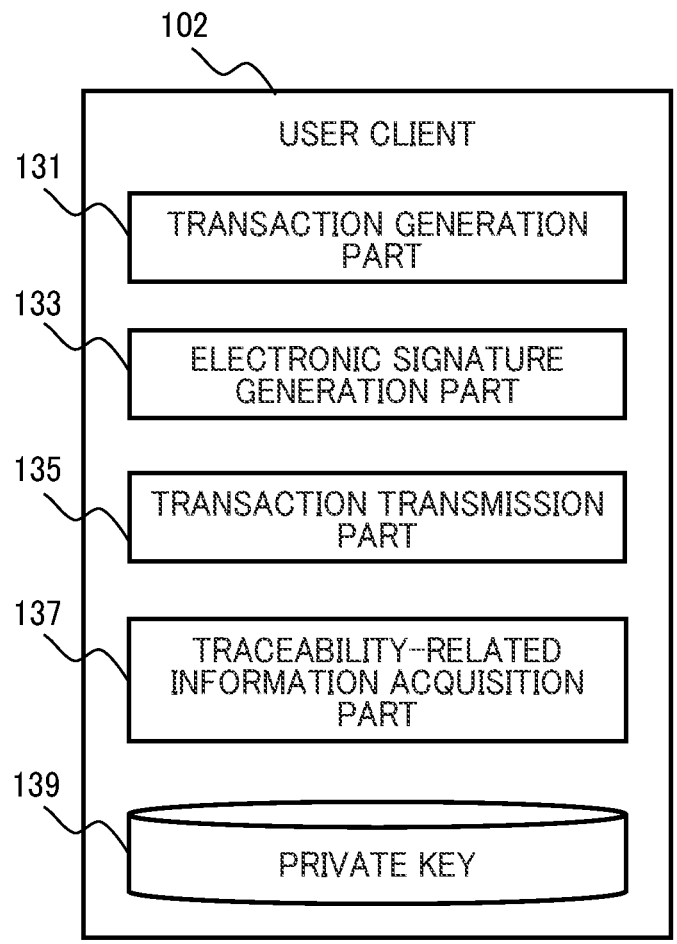
FIG. 6 is a diagram illustrating example functions of a user client.

FIG. 6 is a diagram illustrating example functions of the user client 102. The user client 102 includes a transaction generation part 131 that generates transaction data, an electronic signature generation part 133 that generates an electronic signature to add to transaction data, a transaction transmission part 135 that sends transaction data to the traceability information management server 101, and a traceability-related information acquisition part 137 that acquires information related to distribution channels of a product in a supply chain system (hereinafter referred to as traceability-related information).

The user client 102 stores a predetermined private key 139 which is an electronic signature to add to transaction data.

The functions of each information processing apparatus described above are implemented by hardware in the information processing apparatus or when the processor 41 in the information processing apparatus reads and executes programs stored in the main storage device 42 or the auxiliary storage device 43.

These programs are stored in, for example, a storage device such as a secondary storage device, a nonvolatile semiconductor memory, a hard disk drive, or an SSD, or a non-temporary data storage medium readable by an information processing apparatus, such as an IC card, an SD card, or a DVD.

<<Processing>>

Next, a description is given of processing performed in the traceability system 100. The traceability system 100 executes processing in which the user client 102 transmits a transaction (hereinafter referred to as transaction transmission processing), processing in which supply chain information is updated based on the transaction received by the traceability information management server 101 (hereinafter referred to as supply chain information update processing), and processing in which the traceability information management server 101 provides the user client 102 with information on a supply chain (hereinafter referred to as supply chain information provision processing).

<Transaction Transmission Processing>

Figure 7:
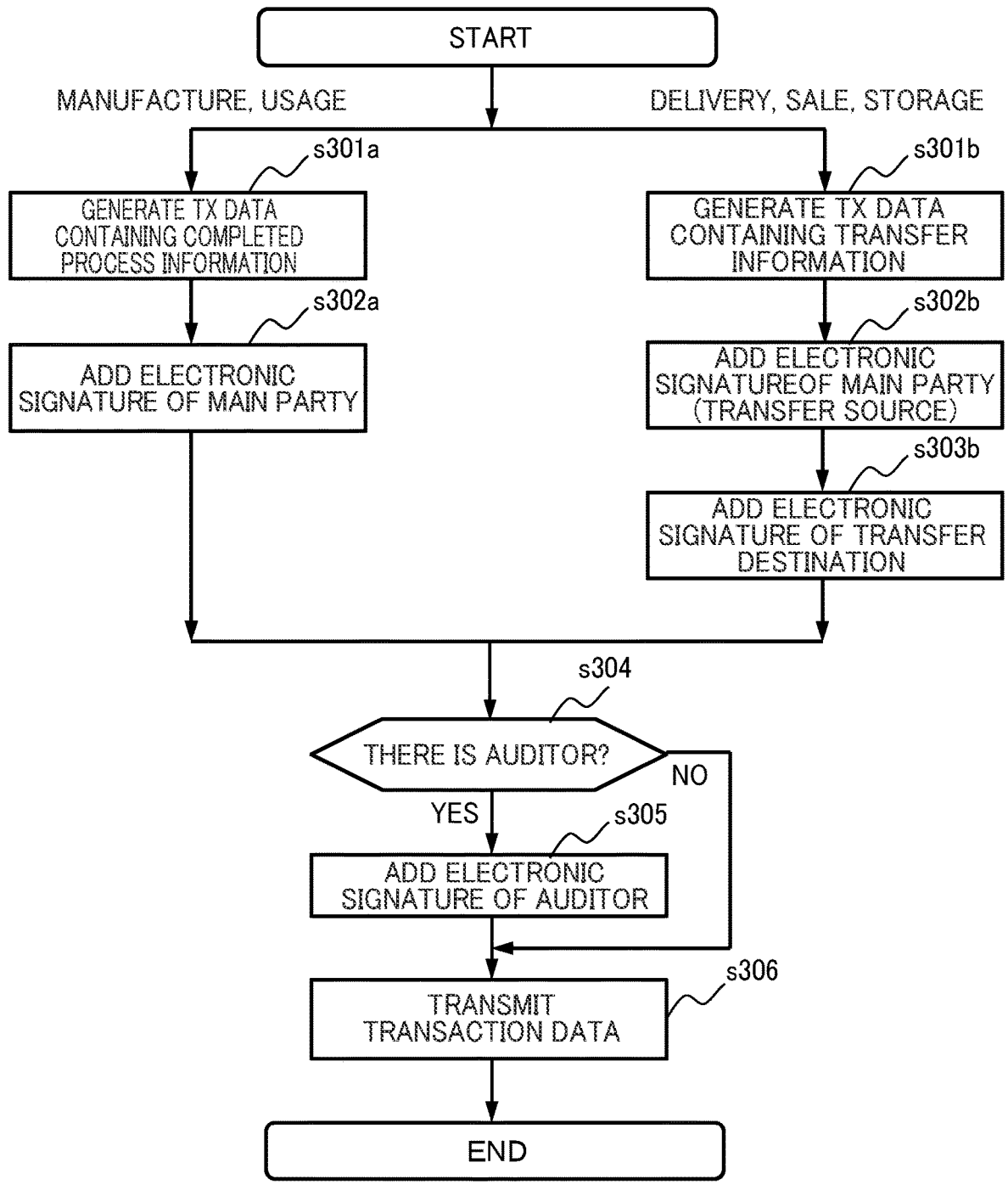
FIG. 7 is a flowchart illustrating an example of transaction transmission processing.

FIG. 7 is a flowchart illustrating an example of transaction transmission processing. This processing is started triggered by, for example, completion of each process in the course of distribution.

First, the user client 102 generates transaction data on a completed process, and adds an electronic signature to the generated transaction data.

For example, if the completed process is a process for which a trail of completion is to be left (for example, a manufacture process or a usage process), the user client 102 generates transaction data containing information on the completed process (referred to as completed process information) (s301a). The user client 102 then adds an electronic signature of the main party (an electronic signature using the private key of the user client 102) to the generated transaction data (s302a) Thereafter, processing in s304 is performed.

If the completed process is a process for which a trail of transfer of ownership or transfer of the right to use is to be left (for example, a delivery process, a sale process, or a storage process), the user client 102 generates transaction data containing information on the contents of the transfer (hereinafter referred to as transfer information) (s301b). The user client 102 then adds the electronic signature of the main party (the transfer source) to the generated transaction data (s302b). The user client 102 also adds the electronic signature of the transfer destination to the transaction data (s303b) Thereafter, processing in s304 is performed.

In s304, the user client 102 determines based on the access right update rule master 1100 whether the completed process has an auditor. If the completed process has an auditor (s304: YES), the user client 102 adds the electronic signature of the auditor to the transaction data (s304). If the completed process does not have an auditor (s304: NO), processing in s306 is performed.

Next, the user client 102 transmits the generated transaction data to the traceability information management server 101 (s306). The transaction transmission processing is thus ended.

There may be more than one auditor and more than one transfer destination. The electronic signatures of the auditor and the transfer destination to be added may be recorded in the user client 102 beforehand, or the user client 102 may request the user clients 102 of the auditor and the transfer destination for their electronic signatures. For example, the user client 102 transmits requests for an electronic signature to the user clients 102 of the auditor and the transfer destination, and receives the electronic signatures from the user clients 102.

<Transaction Data>

Descriptions are now given of transaction data generated in the transaction transmission processing.

(Manufacture Transaction Data)

FIG. 8 is a diagram illustrating an example of transaction data generated upon completion of a manufacture process of a product (manufacture transaction data). Manufacture transaction data 400 has the following pieces of information: a transaction type 401 which is information indicating the type of a transaction ("MANUFACTURE"), a time and date of occurrence 402 which is information on when the transaction has occurred, an operator ID 403 which is information indicating a manufacturer (the main party), an operating machine ID 404 which is information indicating a machine used, an operation kind 405 which is information indicating the kind of the manufacturing operation, a constituent member 406 which is information indicating members before being processed in manufacture (constituent members), and a completed member ID 407 which is information indicating a member obtained by the processing in manufacture (a completed member). Also, an operator's signature 408 which is the electronic signature of the main party (such as an operator or a manufacturer) and an auditor's signature 409 which is the electronic signature of an auditor are added to the manufacture transaction data 400. The manufacture process includes, for example, processing of members and product assembly in the manufacture process. The manufacture transaction data 400 can prove that, for example, a skilled operator has performed processing.

(Delivery Transaction Data)

FIG. 9 is a diagram illustrating an example of transaction data generated upon completion of a delivery process of a product (delivery transaction data). Delivery transaction data 500 includes the following pieces of information: a transaction type 501 which is information indicating the type of a transaction (delivery), a time and date of occurrence 502 which is information on when the transaction has occurred, an order placer ID 503 which is information on a party who has placed the order to be delivered (the main party or the transfer source), an order receiver ID 504 which is information on a destination to which the order has been delivered (the transfer destination), a target member ID 505 which is information on a member delivered, a price 506 which is information on the price of the member delivered, and a payment ID 507 which is information on payment for the delivery. Also, an order-placer's electronic signature 508 which is the electronic signature of the order placer (the main party or the transfer source) and an order-receiver's electronic signature 509 which is the electronic signature of the order receiver (the transfer destination) are added to the delivery transaction data 500.

(Sale Transaction Data)

FIG. 10 is a diagram illustrating an example of transaction data generated upon completion of a sale process of a product (sale transaction data). Sale transaction data 600 includes items such as a transaction type 601 which is information indicating the type of a transaction (i.e., information indicating "SALE"), a time and date of occurrence 602 which is information on when the transaction has occurred, a seller ID 603 which is information on the seller of a product (the main party or the transfer source), a purchaser ID 604 which is information on the purchaser of the product (the transfer destination), a product ID 605 which is information on the product, and a price 606 which is information on the price of the product. Also, a seller's electronic signature 607 which is the electronic signature of the seller and a purchaser's electronic signature 608 which is the electronic signature of the purchaser are added to the sale transaction data 600.

The delivery transaction data 500 and the sale transaction data 600 can be used for, for example, identification of the current owner in the event of recalling of a component or identification of what component is used in the product to handle a complaint from a user.

(Usage Transaction Data)

FIG. 11 is a diagram illustrating an example of transaction data generated upon completion of a usage process of a product (usage transaction data). Usage transaction data 700 includes the following pieces of information: a transaction type 701 which is information indicating the type of a transaction (i.e., information indicating "USAGE"), a period 702 which is the period of time the product in the transaction was used, an owner ID 703 which is the identifier of the owner of the product, and a product ID 704 which is the identifier of the product. Also, an owner's electronic signature 705 which is the electronic signature of the owner (the main party) is added to the usage transaction data 700. For example, the usage transaction data 700 may be used as a proof that a famous person has owned the product so as to serve as information backing up such a fact when the product is sold with added value.

(Storage Transaction Data)

FIG. 12 is a diagram illustrating an example of transaction data generated upon completion of a storage process of a product (storage transaction data). Storage transaction data 800 includes the following pieces of information: a transaction type 801 which is information indicating the type of a transaction (i.e., information indicating "STORAGE"), a period 802 which is information on the period of time the product was stored, an owner ID 803 which is information on the owner of the product, a storer ID 804 which is information on the storer of the product, and a product ID 805 which is information on the product. Also, an owner's electronic signature 806 which is the electronic signature of the transfer source (the main party or the owner) and a storer's electronic signature 807 which is the electronic signature of the transfer destination (the storer) are added to the storage transaction data 800. The storage transaction data 800 can be used as data proving that, for example, wine has been stored under appropriately controlled temperature.

<Supply Chain Information Update Processing>

Figure 13:
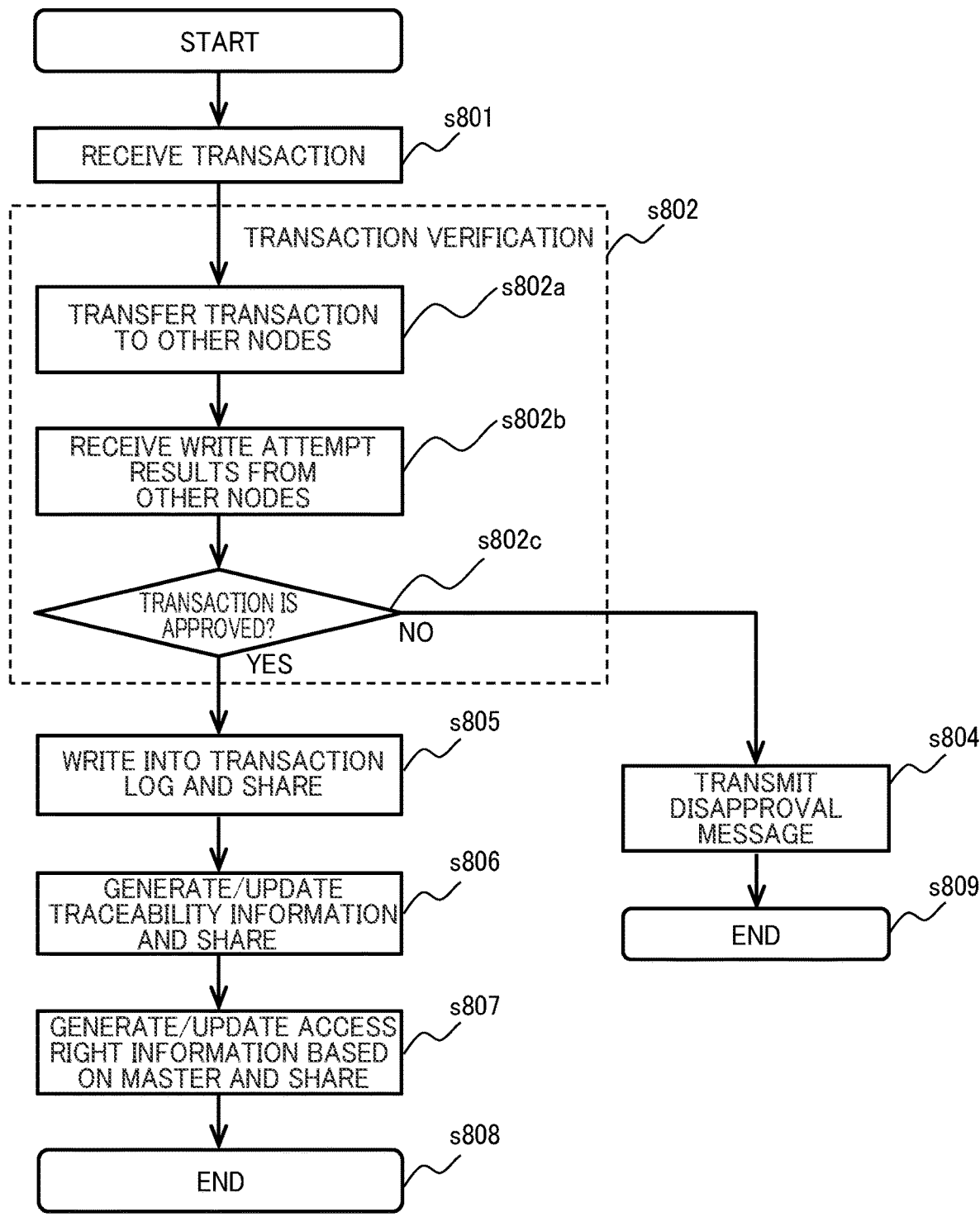
FIG. 13 is a flowchart illustrating an example of supply chain information update processing.

FIG. 13 is a flowchart illustrating an example of the supply chain information update processing. The traceability information management server 101, when receiving transaction data from any of the user clients 102 (s801), verifies the transaction data (s802).

Specifically, for example, the traceability information management server 101 causes the authentication infrastructure system 200 to verify the electronic signature(s) attached to the received transaction data. In other words, the traceability information management server 101 validates the transaction data by performing consensus building processing for the transaction data with the other traceability information management servers 101. For example, the consensus building processing is performed as follows.

First, the traceability information management server 101 transfers the transaction data to the other traceability information management servers 101 (s802*a*). Each of the traceability information management servers 101 to which the transaction data has been transferred attempts predetermined write processing on the transaction data and generates information on the result.

The traceability information management server 101 receives the information on the result generated by each of the other traceability information management servers 101 (s802*b*), and approves the transaction data received in S801 if a certain number or more of the results (or a certain proportion or more of the results, for example, more than half of the results) match, and does not approve the transaction data otherwise.

This consensus building processing performed by the plurality of traceability information management servers 101 can verify the validity of transaction data and reduce risks of wrongdoing such as falsification of transaction data without a specific central manager or a central management server.

If disapproval of the transaction data is determined by such processing (s802*c*: NO), the traceability information management server 101 transmits information indicating disapproval of the received transaction data to the user client 102 (s804), and the supply chain management information update processing ends (s809).

If the transaction data is approved (s802*c*: YES), the traceability information management server 101 temporarily stores the contents of the transaction data, and then, writes blockchain data of the transaction data into the transaction log 104 and shares the blockchain data with the other traceability information management servers 101 (s805).

Specifically, for example, the traceability information management server 101 accumulates pieces of approved transaction data until arrival of predetermined timing (for example, 10-minute intervals), and generates a block of data containing the accumulated transaction data group and a hash of the chronologically previous block of data of transaction data. The traceability information management server 101 thus generates blockchain data of transaction data using a hash. Then, the traceability information management server 101 writes the generated blockchain data into the transaction log 104 and sends the blockchain data to all the other traceability information management servers 101. The blockchain data is thereby shared among the traceability information management servers 101.

Thus, a history of transaction data can be shared among the traceability information management servers 101 in a way that it is impossible to falsify the history of transaction data.

Further, the traceability information management server 101 generates or updates the traceability information 900 based on the received transaction data (s806). The traceability information 900 is thereafter shared with the other traceability information management servers 101.

<Traceability Information 900>

FIG. 14 is a diagram illustrating an example of the traceability information 900. The traceability information 900 is a table listing pieces of transaction data (or processes) and is formed of at least one record having the following items: a transaction ID 901 which is the identifier of a transaction, an input 902 which is input information (to be described later) on the transaction, an output 903 which is output information (to be described later) on the transaction, a transaction type 904 which is information on the type of the transaction, a main party ID 905 which is information on the main party (for example, a manufacturer or a transfer source), a transfer destination ID 906 which is information on a party other than the main party (for example, a transfer destination), and an auditor ID 907 which is information on an auditor.

In the input 902, for example, information on a component (a component ID) is stored if the transaction is a manufacture transaction (there may be more than one component). In the output 903, for example, information on a product (a product ID) is stored if the transaction is a manufacture transaction. For transactions involving only a product, such as a processing transaction or a sale transaction, information is stored only in the output 903, and no information is stored in the input 902.

By referring to the traceability information 900, the traceability information management server 101 can easily trace, for example, a product for which a predetermined component is used and how the owner of the product has changed (forward tracing). The traceability information management server 101 can also search back for a component contained in the product used by a predetermined user (backward tracing).

The traceability information management server 101 can improve the speed of transaction data search by storing pieces of transaction data with different types together as the traceability information 900. This can be used efficiently for, for example, a blockchain system which includes a component which stores information with a data structure like the traceability information 900 in the form of a key-value store.

Referring back to FIG. 13, the traceability information management server 101 generates or updates the access right information 1000 by referring to the access right update rule master 1100 (s807). The access right information 1000 is then shared with the other traceability information management servers 101. The supply chain information update processing is then ended (s808).

<Access Right Information 1000>

FIG. 15 is a diagram illustrating an example of the access right information 1000. The access right information 1000 is information recording whether the main party of each process has a forward access right to data on downstream processes (processes that occur after the process temporally) and a backward access right to upstream processes (processes that occur before the process temporally). For example, a record is added to the access right information 1000 or is updated every time a transition occurs.

The access right information 1000 is formed of at least one record having the following items: a transaction ID 1001 which is the identifier of a transaction, a transaction type 1002 which is the type of the transaction, a target party ID 1003 which is the identifier of the main party in the transaction, a forward access right 1004 indicating whether the main party retains a forward access right (acquired from the access right update rule master 1100), and a backward access right 1005 indicating whether the main party retains a backward access right (acquired from the access right update rule master 1100).

<Traceability Information Provision Processing>

Figure 16:
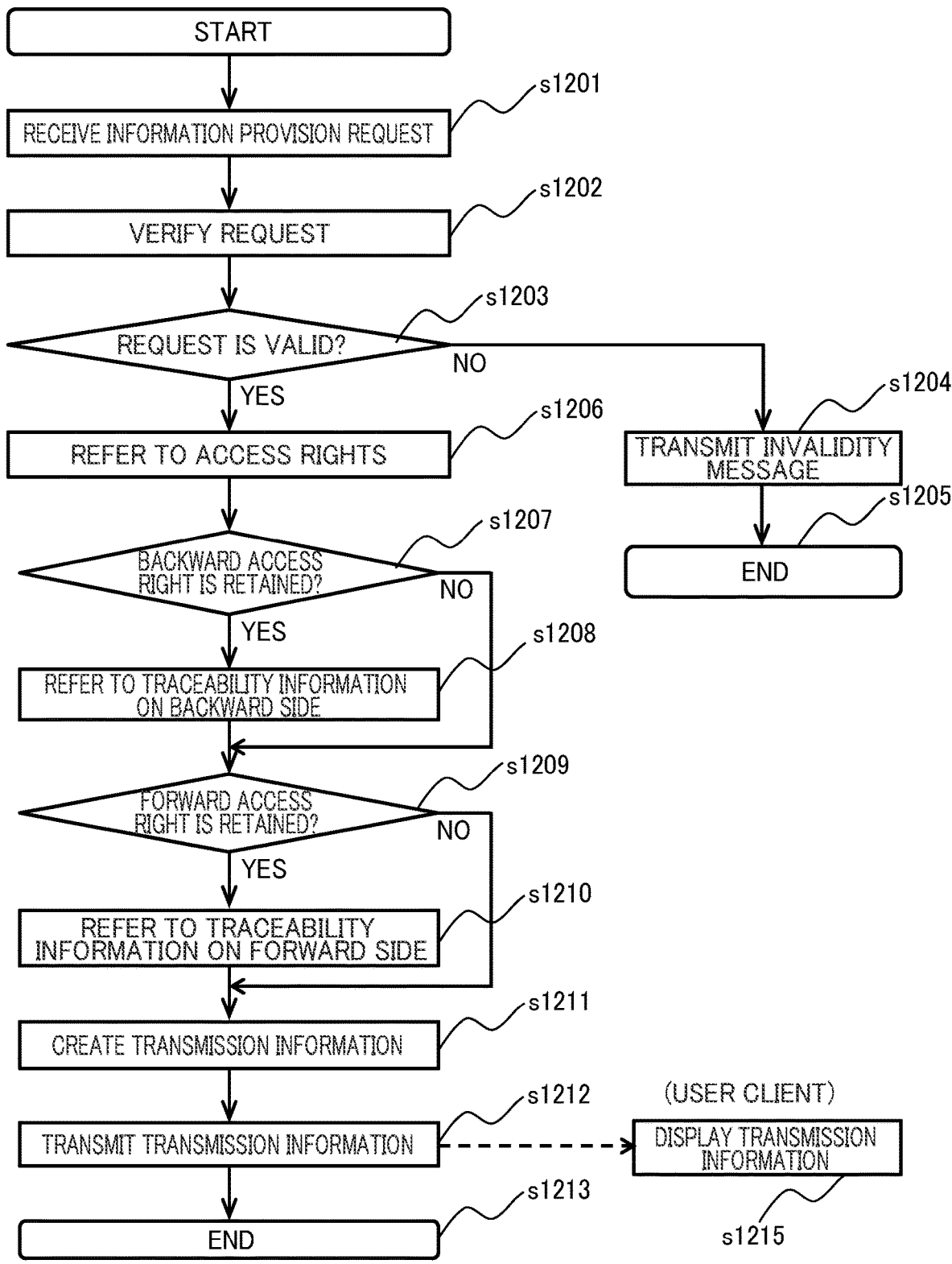
FIG. 16 is a flowchart illustrating an example of traceability information provision processing.

Next, FIG. 16 is a flowchart illustrating an example of the traceability information provision processing. For example, this processing is started after the traceability information management server 101 generates the access right information 1000.

The traceability information management server 101 receives a request for providing traceability information (hereinafter referred to as an information provision request) from the user client 102 (s1201). In the present embodiment, the information provision request is such that an electronic signature using a private key is added to information containing information on the sender (for example, a user ID or the identifier of the user client 102), information on the process completed by the sender requesting provision of information (hereinafter referred to as a request transaction), and information on a product.

The traceability information management server 101 verifies the validity of the information provision request received (s1202). Specifically, for example, the traceability information management server 101 requests the authentication infrastructure system 200 to validate the electronic signature in the information provision request.

When the electronic signature is invalid (s1203: NO), the traceability information management server 101 transmits information indicating that the electronic signature is invalid (an invalidity message) to the user client 102 (s1204), and the traceability information provision processing ends (s1205).

When the electronic signature is valid (s1203: YES), the traceability information management server 101 acquires the access right of the sender of the request transaction (a forward access right and a backward access right) (s1206). Specifically, for example, the traceability information management server 101 acquires the forward access right 1004 and the backward access right 1005 in each record in the access right information 1000, the transaction ID 1001 of which stores information indicated by the request transaction.

If the sender does not have a backward access right (s1207: NO), processing in s1209 to be described later is performed, and if the sender has a backward access right (s1207: YES), the traceability information management server 101 acquires information on the transactions upstream of the request transaction (s1208). Specifically, for example, the traceability information management server 101 identifies transactions upstream of the request transaction in the records acquired in s1206, and acquires the contents of the records in the traceability information 900 which store the identified transactions. Then, processing in s1209 is performed.

In s1209, if the sender does not have a forward access right (s1209: NO), processing in s1211 to be described later is performed, and if the sender has a forward access right (s1209: YES), the traceability information management server 101 acquires information on transactions downstream of the request transaction (s1210). Specifically, for example, the traceability information management server 101 identifies transactions downstream of the request transaction in the records acquired in s1206, and acquires the contents of the records in the traceability information 900 which store the identified transactions. Then, processing in s1211 is performed.

In s1211, the traceability information management server 101 generates data aggregating the information on the transactions upstream of the request transaction acquired in s1208 and the information on the transactions upstream of the request transaction acquired in s1210 (hereinafter referred to as transmission data).

The traceability information management server 101 transmits the generated transmission information to the user client 102 (s1212), and the traceability information provision processing ends (s1213). Meanwhile, the user client 102 displays the received transmission information on a screen or the like (s1215).

As described above, the distribution management apparatus (the traceability information management server 101) of the present embodiment generates, based on transaction data received from the user client 102, the access right information 1000 which is information on the relation between a completed one of processes in the distribution (supply chain) of a predetermined product, a concerned party in the completed process, and a predetermined access right of the concerned party. Meanwhile, based on an information provision request received from the user client 102, the distribution management apparatus (the traceability information management server 101) of the present embodiment identifies, based on the access right information 1000, information on the completed process(es) to which the sender has an access right, and transmits the identified information to the terminal which has transmitted the information provision request.

In other words, the traceability information management server 101 stores the relations between concerned parties in processes in a supply chain and their access rights, and in response to an information provision request from a user, provides only information on a process or processes to which the user has an access right. Thus, access rights to information on the processes in the distribution of a product can be set appropriately. For example, the traceability information management server 101 can perform access right management related to traceability of products and components dynamically and accurately.

The above description of each embodiment is provided to facilitate understanding of the present invention and is not intended to limit the present invention. The present invention may be modified or improved without departing from the gist of the present invention, and such equivalents are also included in the present invention.

For example, although the present embodiment manages processes such as processing, assembly (manufacture), usage, storage, and assignment (sale) in a supply chain in the present embodiment, other processes may be managed in a similar manner.

The access right in the present embodiment includes a forward access right and a backward access right, but besides those, it is also possible to set an access right for each individual process.

A concerned party in the present embodiment is a party to which a product (or a component) is transferred or an auditor, but other concerned parties (interested parties) may be added.

At least the following are demonstrated by the above descriptions herein. Specifically, the distribution management apparatus of the present embodiment may comprise an access right master storage part that stores an access right master which is information storing a relation between a type of each process in the distribution of the product and an access right of each of the concerned parties in the process. Based on the access right master, the access right information generation part may generate, as the access right information, information storing a relation between the type of the completed process, the concerned party in the completed process, and the access right of the concerned party.

Based on the access right master (access right update rule master 1100) storing the relation between the type of each process in the distribution of the product and an access right of each of the concerned parties in the process, the distribution management apparatus generates the access right information 1000 which is information storing the relation between the type of the completed process, the concerned party in the completed process, and the access right of the concerned party. Thus, for example, the information access right of the party that has executed the process can be appropriately managed.

In addition, in the distribution management apparatus of the present embodiment, each of the concerned parties in each process in the access right master may include at least one of a party that executes the process, a party to which the product resulting from the process is transferred, and an auditor of the process.

Since the access right update rule master 1100 has information on the main party executing a process in the distribution of a product, a party to which the product is transferred, and an auditor, various types of processes (transactions) having a business partner and a party conducting an audit can be appropriately managed.

In addition, in the distribution management apparatus of the present embodiment, the access right may include a forward access right which is an access right such that a concerned party retaining the access right is allowed to access a process completed after the process completed by the concerned party, or a backward access right which is an access right such that a concerned party retaining the access right is allowed to access a process completed before the process completed by the concerned party.

Since the access right thus includes a forward access right and a backward access right, all the processes in the supply chain, from the upstream processes to the downstream processes, can be managed.

In addition, a distribution management system of the present embodiment may comprise a plurality of distribution management apparatuses each of which includes: a transaction reception part that receives transaction data from a predetermined terminal, the transaction data containing a completed one of processes in distribution of a predetermined product and information on a concerned party in the completed process; an access right information generation part that generates access right information based on the received transaction data, the access right information being information on a relation between the completed process, the concerned party in the completed process, and a predetermined access right of the concerned party; an information provision request reception part that receives an information provision request for a process in the distribution of the product from a predetermined terminal; an access right determination part that identifies, based on the access right information, information on a process in the distribution to which a sender of the received information provision request has an access right; and an information transmission part that transmits the identified information on the process to the terminal that has sent the information provision request. Each of the distribution management apparatuses may include a transaction data transfer part that, upon receipt of the transaction data, transfers the received transaction data to the other distribution management apparatuses, and a result reception part that receives generation results of predetermined data generated by the other distribution management apparatuses based on the transferred transaction data. The access right information generation part may generate the access right information if a predetermined number of results from among the generated generation results and the received generation results match.

The distribution management apparatus performs consensus building processing in which the distribution management apparatus transfers received transaction data to the other distribution management apparatuses, receives generation results of predetermined data generated by the other distribution management apparatuses based on the transaction data, and generates the access right information 1000 if a predetermined number of results from among the received generation results match. Thus, the validation of transaction data can be verified to reduce risks of wrongdoing such as data falsification. By use of the blockchain technology, traceability information which is impossible to falsify and can solidly prove the recorder can be managed.

In addition, in the distribution management apparatus of the present embodiment, each of the distribution management apparatuses may include a transaction sharing part that generates a block of data containing the received transaction data and a hash of past transaction data if the predetermined number of results match, and shares blockchain data containing the generated block of data with the other distribution management apparatuses.

Since each distribution management apparatus constitutes a blockchain system in which the distribution management apparatus shares blockchain data of transaction data with the other distribution management apparatuses, a large quantity of transaction data can be managed in a secure manner.

REFERENCE SIGNS LIST

100 traceability system
101 traceability information management server
102 user client
113 transaction reception part
1171 access right information generation part
121 access right determination part
123 information transmission part

The invention claimed is:

1. A distribution management apparatus comprising:
one or more processors; and
a memory storing instructions that when executed by the one or more processors, configures the one or more processors to:
store rule master information indicating, for each of a plurality of types of processes of distribution of a predetermined product, whether a concerned party has a forward access right and a backward access right,
receive a plurality of transaction data from a predetermined terminal, each transaction data indicating information of a completed process among the plurality of processes and the concerned party of the completed process,
generate access right information for each of the plurality of the received transaction data, the access right information indicating, for each transaction, whether the concerned party in the completed process has the forward access right and the backward access right, and the type of the respective process, the forward access right indicating a right to access data of processes downstream from the completed process and the backward access right indicating a right to access data of processes upstream from the completed process,
receive an information provision request for a process in the distribution of the product from a predetermined terminal,
determine whether a sender of the received information provision request has the downstream access right and/or has the upstream access right based on the generated access right information, identify, based on the determination, information of a downstream process and/or an upstream process to which the sender is determined to have the right to access, and transmit the identified information on the process to the terminal that has sent the information provision request.

2. The distribution management apparatus according to claim 1, wherein each of the concerned parties in each process in the access right master includes at least one of a party that executes the process, a party to which the product resulting from the process is transferred, and/or an auditor of the process.

3. A distribution management system, comprising;

a plurality of distribution management apparatuses each of which includes:

one or more processors; and a memory storing instructions that when executed by the one or more processors, configures the one or more processors to:

store rule master information indicating, for each of a plurality of types of processes of distribution of a predetermined product, whether a concerned party has a forward access right and a backward access right, receive a plurality of transaction data from a predetermined terminal, each transaction data indicating information of a completed processes among a plurality of processes and a concerned party in the completed process, generate access right information for each of the plurality of the received transaction data, the access right information indicating, for each transaction, whether the concerned party in the completed process has the forward access right and the backward access right, and the type of the respective process, the forward access right indicating a right to access data of processes downstream from the completed process and the backward access right indicating a right to access data of processes upstream from the completed process, receive an information provision request for a process in the distribution of the product from a predetermined terminal, determine whether a sender of the received information provision request has the downstream access right and/or has the upstream access right based on the generated access right information, identify, based on the determination, information of a downstream process and/or an upstream process to which the sender is determined to have the right to access;

transmit the identified information on the process to the terminal that has sent the information provision request, upon receipt of the transaction data, transfer the received transaction data to the other distribution management apparatuses, and receive, from the other distribution management apparatuses, generation results of predetermined data generated by the other distribution management apparatuses based on the transferred transaction data.

4. The distribution management system according to claim 3, wherein the processor of each of the distribution management apparatuses is configured to generate a block of data containing the received transaction data and a hash of past transaction data, and share blockchain data containing the generated block of data with the other distribution management apparatuses.

5. A distribution management method executed by a distribution management apparatus, the method comprising:

storing rule master information indicating, for each of a plurality of types of processes of distribution of a predetermined product, whether a concerned party has a forward access right and a backward access right;

receiving plurality of transaction data from a predetermined terminal, each transaction data indicating information of a completed process among the plurality of processes and the concerned party of the completed process;

generating access right information for each of the plurality of the received transaction data, the access right information indicating, for each transaction, whether the concerned party in the completed process has the forward access right and the backward access right, and the type of the respective process, the forward access right indicating a right to access data of processes downstream from the completed process and the backward access right indicating a right to access data of processes upstream from the completed process;

receiving an information provision request for a process in the distribution of the product from a predetermined terminal;

determining whether a sender of the received information provision request has the downstream access right and/or has the upstream access right based on the generated access right information;

identifying, based on the determination, information of a downstream process and/or an upstream process to which the sender is determined to have the right to access, and information transmission processing to transmit the identified information on the process to the terminal that has sent the information provision request.

6. The distribution management method according to claim 5, wherein each of the concerned parties in each process in the access right master includes at least one of a party that executes the process, a party to which the product resulting from the process is transferred, and/or an auditor of the process.

7. The distribution management method according to claim 5, the method further comprising:

upon receipt of the transaction data, transferring the received transaction data to other distribution management apparatuses; and receiving, from the other distribution management apparatuses, generation results of predetermined data generated by the other distribution management apparatuses based on the transferred transaction data.

8. The distribution management method according to claim 7,

Wherein each of the distribution management apparatuses executes transaction sharing processing to generate a block of data containing the received transaction data and a hash of past transaction data, and sharing blockchain data containing the generated block of data with the other distribution management apparatuses.

* * * * *